United States Patent
Skultety-Betz et al.

(10) Patent No.: US 8,681,318 B2
(45) Date of Patent: Mar. 25, 2014

(54) DISTANCE MEASURING DEVICE

(75) Inventors: Uwe Skultety-Betz, Leinfelden-Echtersingen (DE); Tobias Claudius, Berlin (DE)

(73) Assignee: Robert Bosch GmbH, Stuttgart (DE)

( * ) Notice: Subject to any disclaimer, the term of this patent is extended or adjusted under 35 U.S.C. 154(b) by 2052 days.

(21) Appl. No.: 10/502,411

(22) PCT Filed: Apr. 2, 2003

(86) PCT No.: PCT/DE03/01080
§ 371 (c)(1),
(2), (4) Date: Jul. 23, 2004

(87) PCT Pub. No.: WO03/087718
PCT Pub. Date: Oct. 23, 2003

(65) Prior Publication Data
US 2005/0128465 A1    Jun. 16, 2005

(30) Foreign Application Priority Data
Apr. 12, 2002    (DE) .................................. 102 16 207

(51) Int. Cl.
*G01C 3/08*    (2006.01)

(52) U.S. Cl.
USPC .................... 356/4.01; 356/3.01; 356/5.01

(58) Field of Classification Search
USPC ............. 356/3.01–3.15, 4.01–4.1, 5.01–5.15, 356/6–22, 28, 28.5
See application file for complete search history.

(56) References Cited

U.S. PATENT DOCUMENTS

| | | | |
|---|---|---|---|
| 4,730,190 A | 3/1988 | Win | |
| 5,051,934 A | 9/1991 | Wiklund | |
| 5,623,709 A | 4/1997 | Kaji | |
| 5,767,952 A | 6/1998 | Ohtomo et al. | |
| 5,949,529 A * | 9/1999 | Dunne et al. | 356/4.01 |
| 5,960,413 A * | 9/1999 | Amon et al. | 705/28 |
| 6,037,874 A * | 3/2000 | Heironimus | 340/686.1 |
| 6,324,455 B1 * | 11/2001 | Jackson | 701/50 |
| 6,396,571 B2 | 5/2002 | Ohtomo et al. | |
| 2002/0008866 A1 * | 1/2002 | Ohtomo et al. | 356/5.1 |

FOREIGN PATENT DOCUMENTS

| | | |
|---|---|---|
| DE | 101 25 183 A1 | 3/2002 |
| JP | 64-57112 | 3/1989 |
| JP | 7-243855 | 9/1995 |
| JP | 8-220632 | 8/1996 |
| JP | 11-118487 | 4/1999 |
| JP | 2001-74450 | 3/2001 |
| JP | 2002-39748 | 2/2002 |
| WO | 90/12330 | 10/1990 |

* cited by examiner

*Primary Examiner* — Luke Ratcliffe
(74) *Attorney, Agent, or Firm* — Michael J. Striker

(57) ABSTRACT

The present invention is directed to a distance measuring device (10), in particular a handheld laser distance measuring device, with a position sensor (22) for determining the spatial orientation of the distance measuring device (10). It is proposed that the position sensor (22) is connected with a signal transducer (12), whereby the signal transducer (12) is capable of being triggered by the position sensor (22) to emit a perceptible signal which depends on the spatial orientation.

6 Claims, 5 Drawing Sheets

DISTANCE MEASURING DEVICE

CROSS-REFERENCE TO A RELATED APPLIACTION

The invention described and claimed hereinbelow is also described in German Patent Application DE 102 16 207.7 filed on Apr. 12, 2002. This German Patent Application, whose subject matter is incorporated here by reference, provides the basis for a claim of priority of invention under 35 U.S.C. 119(a)-(d).

BACKGROUND OF THE INVENTION

The present invention relates to a distance measuring device.

Laser distance measuring devices are known that determine the distance to a target object using a laser. In determining the horizontal distance, the laser beam must be oriented as exactly horizontally as possible to prevent measurement errors.

To this end, known laser distance measuring devices include "bubble tubes", via which the operator can recognize the tilt of the distance measuring device relative to the horizontal line.

With this type of orientation of the laser measuring device, the operator must therefore simultaneously set his sights on the target object to be measured and look at the bubble tube, which is difficult with handheld distance measuring devices in particular.

Furthermore, laser distance measuring devices are known, with which the tilt of the laser distance measuring device is determined using an integrated tilt sensor, to subsequently correct the measured distance based on trigonometric relationships

SUMMARY OF THE INVENTION

Advantages Of The Invention

The present invention includes the general technical teaching that the distance measuring device has a position sensor that detects the spacial orientation of the distance measuring device, whereby the position sensor is connected with a signal transducer that emits a perceptible signal that is a function of the spacial orientation of the distance measuring device.

The operator can therefore concentrate on setting his sights on the target object when operating the distance measuring device and is thereby informed via the signal transducer about the spacial orientation of the distance measuring device.

The signal transducer can be, e.g., an optical signal transducer, an acoustic signal transducer and/or a tactile signal transducer. The present invention is not limited to these types of signal transducers, however. The only decisive point is that the signal emitted by the signal transducer be perceptible by the operator and contain information about the spacial orientation of the distance measuring device.

In the preferred embodiment of the invention, the signal transducer is an optical signal transducer, however, which is capable of being triggered by the position sensor to emit an optical signal, whereby the intensity, color, brightness, blinking frequency and/or blinking duration are a function of the spacial orientation of the distance measuring device. For example, the blinking frequency can be increased as the orientation of the distance measuring device approaches the horizontal line, until the optical signal transducer finally remains illuminated when the distance measuring device is oriented approximately horizontally. It is also possible as an alternative, however, that, given a constant blinking frequency, the duration of the individual blinking pulses is changed when there is a deviation from the horizontal line.

The optical signal transducer is preferably the laser that is also used for distance measurement. This offers the advantage that a separate signal transducer can be eliminated, which enables economical fabrication.

In another variant of the present invention, an acoustic signal transducer is used as the signal transducer, which emits an acoustic signal which is a function of the spacial orientation of the distance measuring device. A conventional loudspeaker can be used for this purpose, for example, although other electro-acoustic converters are also usable.

The signal emitted by the acoustic signal transducer can be changed, e.g., as a function of the spacial orientation of the distance measuring device, in terms of its pitch and/or tonal frequency, volume, frequency and/or duration of recurrence to inform the operator about the spacial orientation of the distance measuring device. For example, the acoustic signal transducer can emit beep tones at specified intervals, whereby the interval duration becomes shorter as the distance measuring device approaches the horizontal line, until the acoustic signal transducer finally emits a steady beep tone when the distance measuring device is located approximately in the horizontal line.

Further, it is also possible that the signal transducer is a tactile signal transducer that emits to the operator a perceptible tactile signal which is a function of the spacial orientation of the distance measuring device. For example, with handheld distance measuring devices, an electromechanical actuator can be installed in a handle of the distance measuring device, which transmits a tactile signal to the operator's hand. The tactile signal can be a series of pressure pulses, for example, whereby the interval duration between the individual pressure pulses is varied as a function of the spacial orientation of the distance measuring device. For example, the interval duration can be reduced as the distance measuring device approaches the horizontal line. It is also possible, however, that a vibration generator is used as tactile signal transducer, which generates a vibration signal as long as the distance measuring device is not oriented correctly.

In the preferred embodiment of the invention, the position sensor is a tilt sensor that measures the angle of tilt of the distance measuring device. The tilt sensor is preferably situated such that the measured angle of tilt is equal to the angle between the laser beam and the horizontal or vertical lines.

It is also possible as an alternative, however, that the position sensor does not measure the elevation angle, but rather the angle in a horizontal line. This can be advantageous, for example, when various target objects which lie in a horizontal line and should form a specified angle are sighted in sequence, so that trigonometric calculations can be carried out subsequently with reference to the measured results. The position sensor can contain a compass, for example, which makes a corresponding angular measurement possible.

The measured elevation or azimuth angles are preferably compared with a specified setpoint value. In the example of a horizontal distance measurement described initially, this setpoint value typically corresponds to the horizontal line with an elevation angle of zero degrees. With a vertical height measurement, on the other hand, the setpoint value typically corresponds to an elevation angle of 90 degrees.

In an advantageous variant of the invention, the distance measuring device enables a horizontal distance measurement and a vertical height measurement by adjusting the particular setpoint value accordingly. This adjustment of the setpoint value for the angle of tilt can take place manually by the operator, for example, by the operator entering the desired operating mode via an input device of the distance measuring device.

In a variant of the invention it is provided, on the other hand, that the distance measuring device adjusts the setpoint angle automatically. For example, the setpoint angle can be set to zero degrees in accordance with the horizontal line when the currently measured elevation angle is between −30 degrees and +30 degrees. The setpoint angle, on the other hand, is set to 90 degrees in accordance with the vertical line when the currently measured elevation angle is between +60 degrees and +120 degrees. In this variant of the invention, the operator need therefore only orient the distance measuring device roughly horizontally or vertically, and the associated setpoint value is automatically set.

Further advantages result from the following description of the drawing. An exemplary embodiment of the invention is presented in the drawing. The drawing, description, and claims contain numerous features in combination. One skilled in the art will advantageously consider them individually as well and combine them into reasonable further combinations.

DESCRIPTION OF THE PREFERRED EMBODIMENTS

Figure 1:
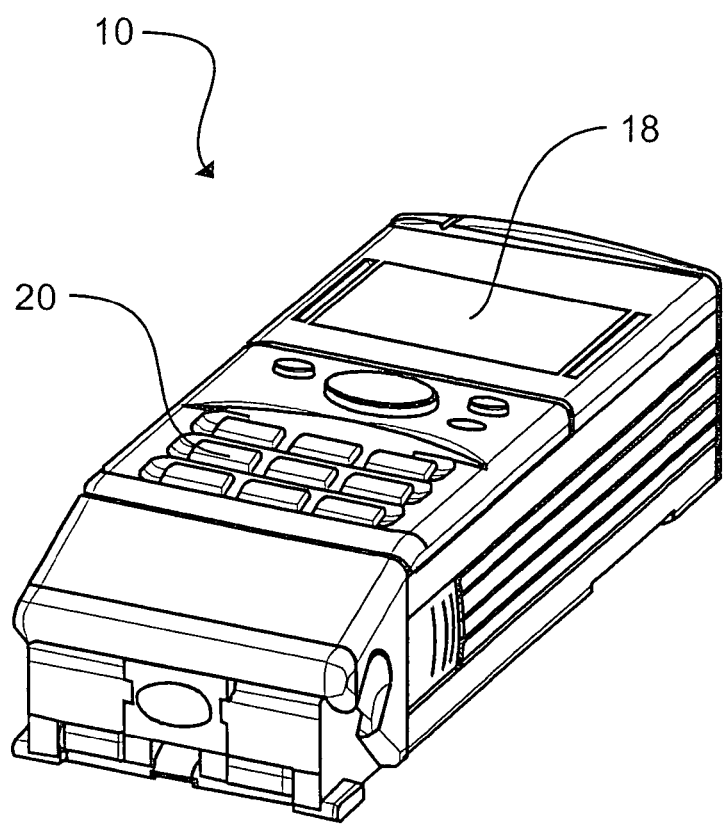
FIG. 1 shows a perspective depiction of a laser distance measuring device according to the invention.

The perspective depiction in FIG. 1 shows a handheld laser distance measuring device 10 that makes it possible to carry out a precise distance measurement without a stand. To this end, laser distance measuring device 10 emits a laser beam at its front side in a conventional manner, the laser beam being directed at the target object to be measured and being reflected off of it. The distance to the target object to be measured can be calculated based on the propagation time from the time the laser beam is emitted by laser distance measuring device 10 until it is received.

To this end, laser distance measuring device 10 has an integrated laser 12 that is controlled by a control unit 14.

To receive the laser beam reflected on the target object, laser distance measuring device 10 further includes an optical sensor which is also connected with control unit 14, so that control unit 14 calculates the distance to the target object to be measured and emits a corresponding distance signal d to a display 18 which is located on the top side of laser distance measuring device 10.

Laser distance measuring device 10 is operated using a keypad 20, which is also located on the top side of laser distance measuring device 10.

The unique feature of laser distance measuring device 10 is the fact that, with it, spacial orientation during the measurement procedure is simplified. For example, laser distance measuring device 10 must be oriented as exactly horizontally as possible during a horizontal distance measurement, or measurement errors will occur. Accordingly, laser distance measuring device 10 must be oriented as exactly vertically as possible during a vertical height measurement to achieve a high level of measurement accuracy.

Laser distance measuring device 10 therefore includes an integrated tilt sensor 22 that measures the tilt of laser distance measuring device 10 and emits a corresponding angle of tilt $\alpha$. Tilt sensor 22 is located in laser distance measuring device 10 in such a manner that angle of tilt $\alpha$ indicates the angle formed by the laser beam relative to the horizontal line.

On the output side, tilt sensor 22 is connected with a comparator unit 24 that compares the measured angle of tilt $\alpha$ with a specified setpoint angle $\alpha_{SOLL}$ which the operator can enter or select on keypad 20. To carry out a horizontal distance measurement, the operator then enters a setpoint angle of $\alpha_{SOLL}=0°$ on keypad 20, which corresponds to the horizontal line. To carry out a vertical height measurement, the operator then enters a setpoint angle of $\alpha SOLL=0°$ on keypad 20, which corresponds to the vertical line.

Comparator unit 24 emits an angle of error $\Delta\alpha=\alpha-\alpha_{SOLL}$ on the output side that indicates the deviation of the current spacial orientation of laser distance measuring device 10 from the desired spacial orientation.

Angle of error $\Delta\alpha$ is then supplied to a control unit 26 that calculates a blinking frequency f as a function of angle of error $\Delta\alpha$, whereby blinking frequency f decreases as angle of error $\Delta\alpha$ decreases.

Blinking frequency f, which is determined by control unit 26, is then supplied to control unit 14, whereby control unit 14 controls laser 12 such that the emitted laser beam blinks with blinking frequency f. Based on blinking frequency f of laser 12, the operator can then determine if laser distance measuring device 10 is oriented correctly. In so doing, the operator need only move laser distance measuring device 10 such that the blinking becomes faster, until laser 12 finally beams constantly when laser distance measuring device 10 is oriented in accordance with the specified angle $\alpha_{SOLL}$, and the actual distance measurement can therefore be carried out.

Figure 2:
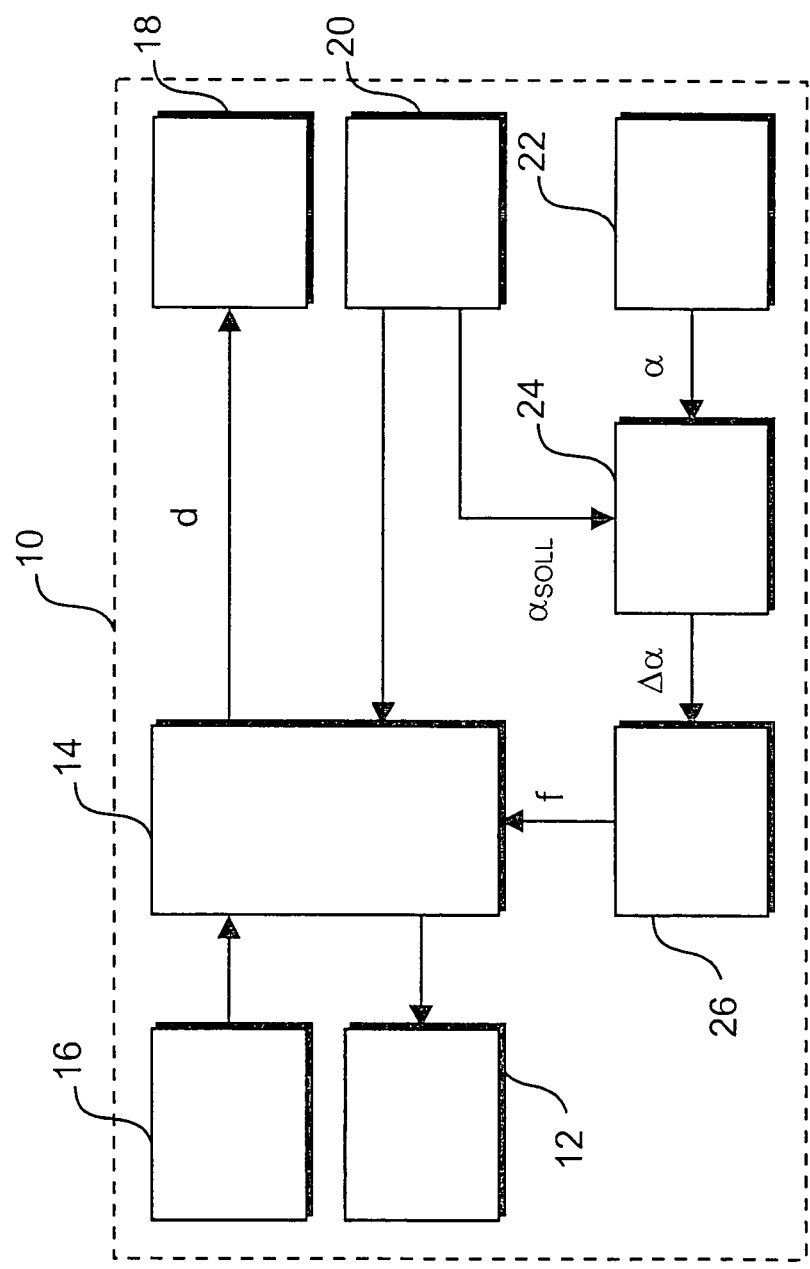
FIG. 2 shows a simplified block diagram of the laser distance measuring device from FIG. 1.
Figure 3:
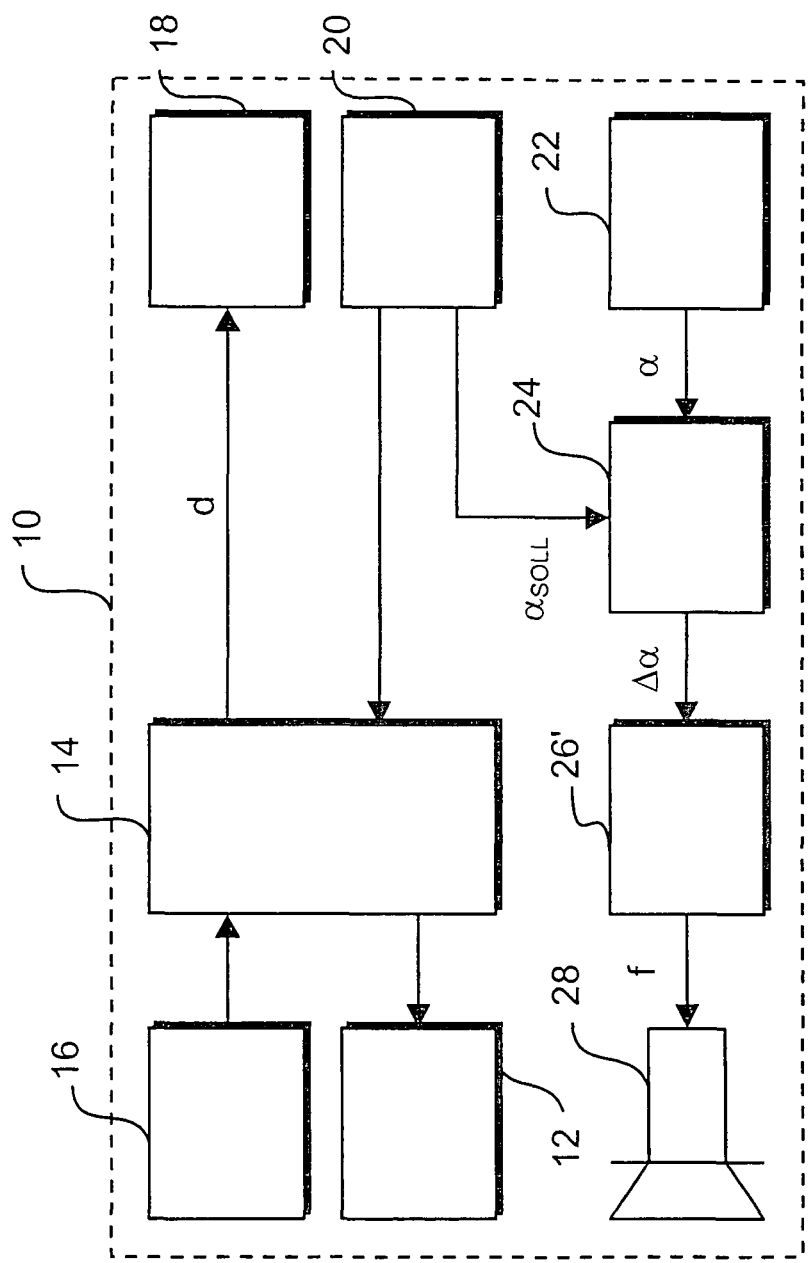
FIG. 3 shows a block diagram of an alternative laser distance measuring device with a loudspeaker.

The exemplary embodiment depicted in FIG. 3 largely conforms with the exemplary embodiment described herein above and depicted in FIGS. 1 and 2, so the same reference numerals will be used herein below for corresponding components, and the above description will be referred to, to avoid repetition. A unique feature of this exemplary embodiment is that, to support the operator in the spacial orientation of laser distance measuring device 10, a loudspeaker 28 is provided that is controlled by a control unit 26' having a variable frequency f. Control unit 26' determines frequency f as a function of angle of error $\Delta\alpha$, whereby frequency f decreases as angle of error $\Delta\alpha$ decreases.

In a horizontal distance measurement, the pitch of the signal emitted by loudspeaker 28 therefore increases the more closely the horizontal line is approached, so that the operator can correctly orient laser distance measuring device 10 in a simple manner.

In a vertical distance measurement, the pitch of the signal emitted by loudspeaker 28 increases accordingly the more closely the vertical line is approached.

Figure 4:
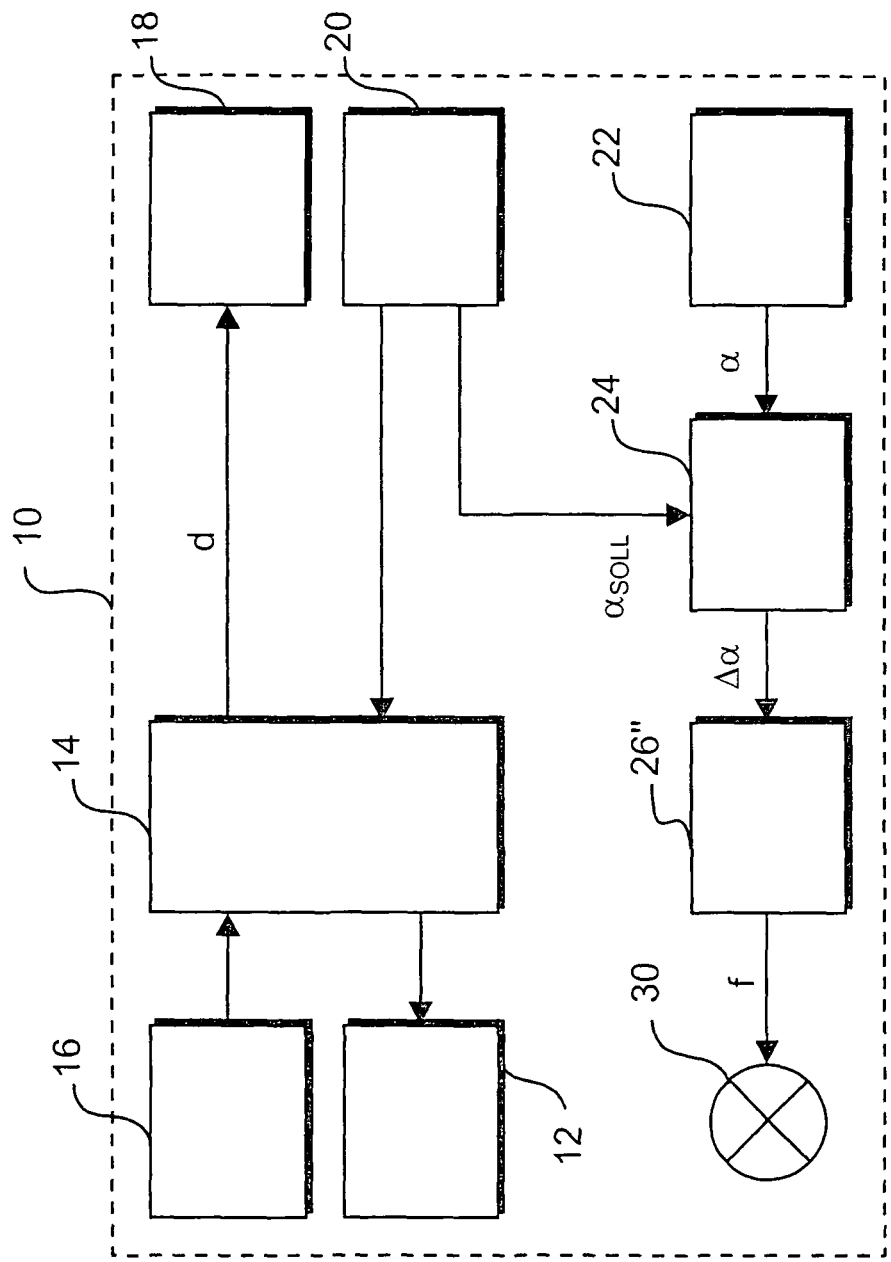
FIG. 4 shows a block diagram of an alternative laser distance measuring device with a signal lamp.
Figure 5:
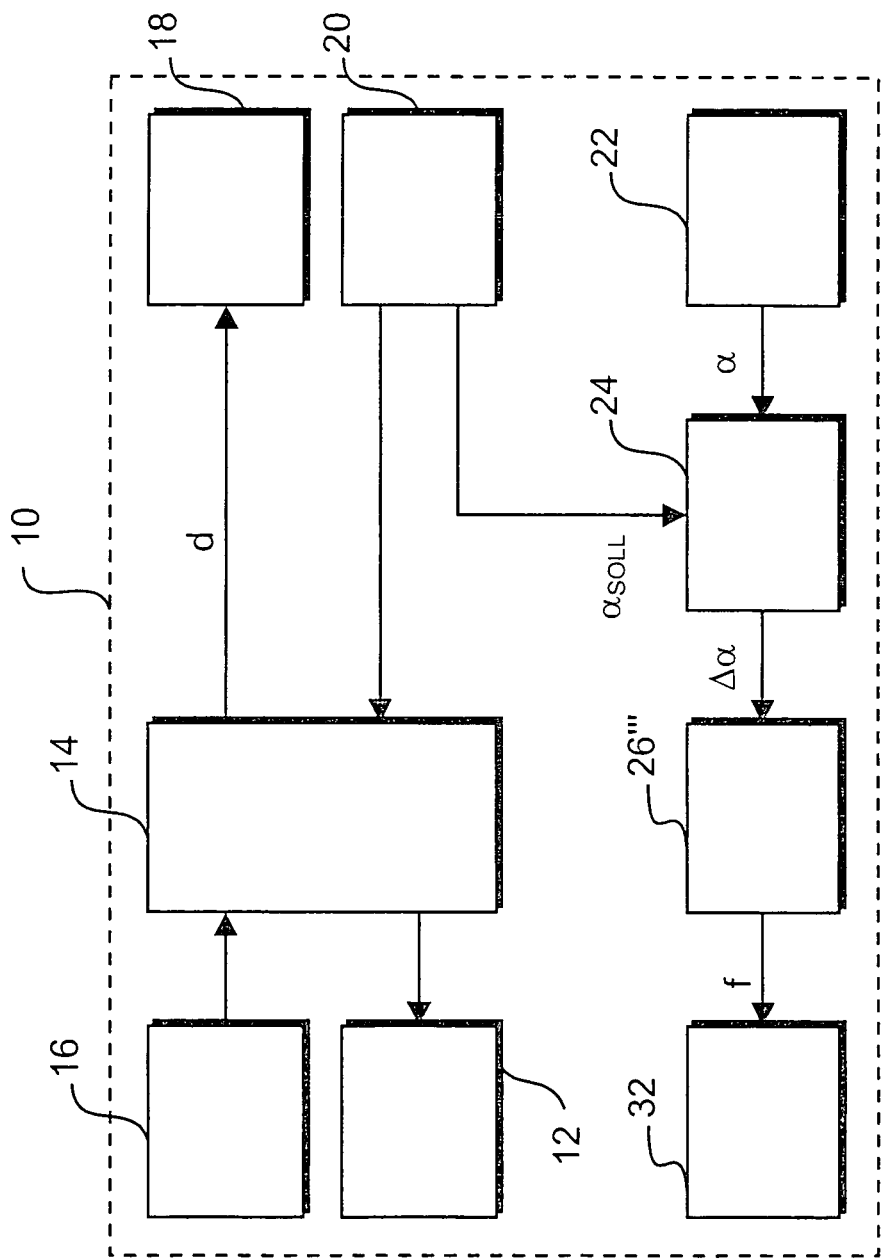
FIG. 5 shows a block diagram of an alternative laser distance measuring device with a tactile signal transducer.

The exemplary embodiment depicted in FIG. 4 also largely conforms with the exemplary embodiment described herein above and depicted in FIGS. 1 and 2, so the same reference numerals will be used herein below for corresponding components, and the above description will be referred to, to avoid repetition.

The unique feature of this exemplary embodiment is that a signal lamp 30 is provided to signal the spacial orientation of laser distance measuring device 10, whereby signal lamp 30 is positioned on laser distance measuring device 10 such that the operator sees signal lamp 30 when sighting the target object. This positioning of signal lamp 30 is advantageous because, in this manner, the operator can simultaneously sight the target object and check the spacial orientation of laser distance measuring device 10.

Signal lamp 30 is controlled by a control unit 26″ with a blinking frequency f, whereby blinking frequency f increases as laser distance measuring device 10 approaches the desired setpoint angle $\alpha_{SOLL}$. Signal lamp 30 therefore blinks that much faster the more exactly laser distance measuring device 10 is oriented.

The exemplary embodiment depicted in FIG. 4 also largely conforms with the exemplary embodiment described herein above and depicted in FIGS. 1 and 2, so the same reference numerals will be used herein below for corresponding components, and the above description will be referred to, to avoid repetition.

The unique feature of this exemplary embodiment is that, to signal the spacial orientation of laser distance measuring device 10, a tactile signal transducer 32 is provided that emits a tactile signal to the operator, who is holding laser distance measuring device 10 in his hand. Tactile signal transducer 32 emits short pressure pulses with a specified frequency of recurrence f to the operator, whereby the frequency of recurrence f is a function of angle of error $\Delta\alpha$ and is calculated by a control unit 26‴.

As the spacial orientation of laser distance measuring device 10 approaches the desired orientation, frequency of recurrence f increases, based on which the operator can check the spacial orientation of laser distance measuring device 10.

The design of invention is not limited to the preferred exemplary embodiments indicated herein above. Rather, a number of variants are feasible which make use of the means of attaining the invention that were presented, even with fundamentally different types of designs.

REFERENCE NUMERALS

10 laser distance measuring device
12 laser
14 control unit
16 optical sensor
18 display
20 keypad
22 tilt sensor
24 comparator unit
26, 26', 26″, 26‴ control unit
28 loudspeaker
30 signal lamp
32 tactile signal transducer

What is claimed is:

1. A handheld laser distance measuring device comprising:
a position sensor (22) for determining the spatial orientation of the distance measuring device that is connected with a laser,
wherein the position sensor (22) and the laser are integrated in a housing,
wherein the laser is triggered by the position sensor (22) to emit a perceptible signal to perform a spatial orientation measuring function, whereby the perceptible signal depends on the spatial orientation and operates to communicate the spatial orientation,
wherein the laser performs a distance measuring function by emitting light in the visible wavelength range to measure distances,
whereby the laser is aimed to emit a signal being perceptible by sighting a target object, and
wherein the spatial orientation dependent perceptible signal blinks at a blink frequency prior to a time in which a horizontal axis of the distance measuring device is substantially aligned with a horizontal extending from the distance measuring device to the target object.

2. A handheld laser distance measuring device as recited in claim 1, wherein upon substantial alignment the perceptible signal no longer blinks but remains fully illuminated, communicating said substantial alignment.

3. A handheld laser distance measuring device as recited in claim 1, wherein the position sensor (22) is a tilt sensor.

4. A handheld laser distance measuring device as recited in claim 1, wherein the position sensor (22) is a tilt sensor that measures an angle formed by the horizontal extending from the distance measuring device to the target object and, the horizontal axis of the distance measuring device.

5. A handheld laser distance measuring device as recited in claim 4, wherein the tilt sensor further includes a compass.

6. A handheld laser distance measuring device as recited in claim 4, wherein the tilt sensor measures a vertical alignment or orientation of the distance measuring device during a vertical height measurement of a target object.

* * * * *